No. 849,984. PATENTED APR. 9, 1907.
T. DOUGHERTY.
GRAIN BIN.
APPLICATION FILED JUNE 27, 1905.
6 SHEETS—SHEET 1.
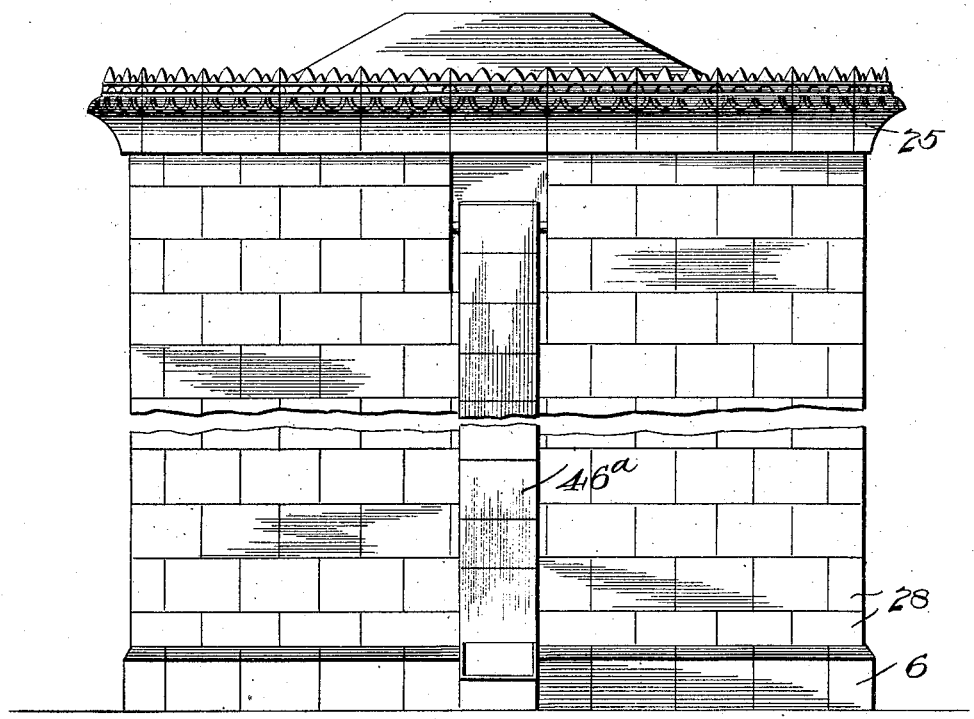
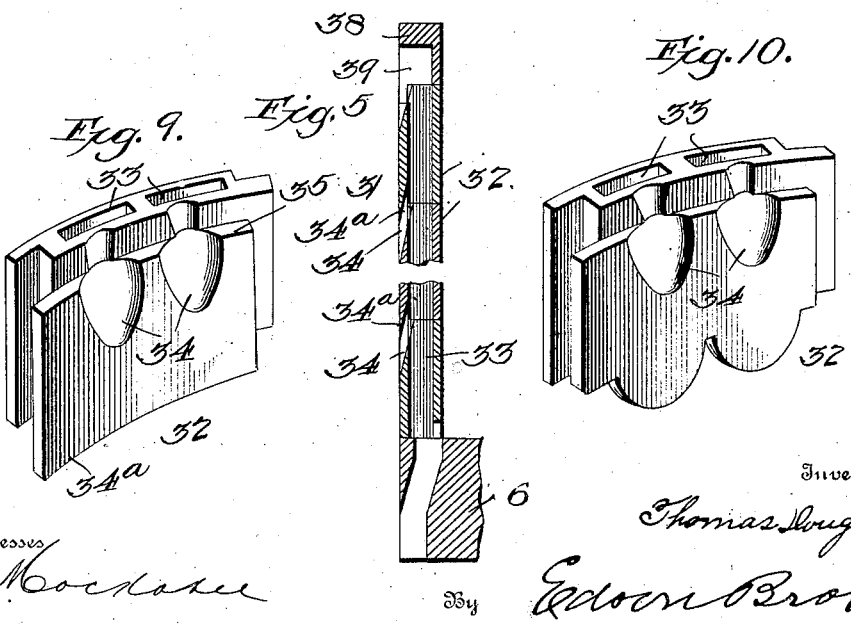
Witnesses
T. L. Mockabee
F. J. Veihmeyer
Inventor
Thomas Dougherty
By Edson Bros.
Attorneys No. 849,984.

PATENTED APR. 9, 1907.

T. DOUGHERTY.
GRAIN BIN.
APPLICATION FILED JUNE 27, 1905.

6 SHEETS—SHEET 2.

No. 849,984. PATENTED APR. 9, 1907.
T. DOUGHERTY.
GRAIN BIN.
APPLICATION FILED JUNE 27, 1905.

6 SHEETS—SHEET 3.

No. 849,984.  
PATENTED APR. 9, 1907.  
T. DOUGHERTY.  
GRAIN BIN.  
APPLICATION FILED JUNE 27, 1905.

6 SHEETS—SHEET 4.

WITNESSES:  
INVENTOR  
Thomas Dougherty  
By Edson Bros,  
Attorneys

No. 849,984. PATENTED APR. 9, 1907.
T. DOUGHERTY.
GRAIN BIN.
APPLICATION FILED JUNE 27, 1905.
6 SHEETS—SHEET 5.
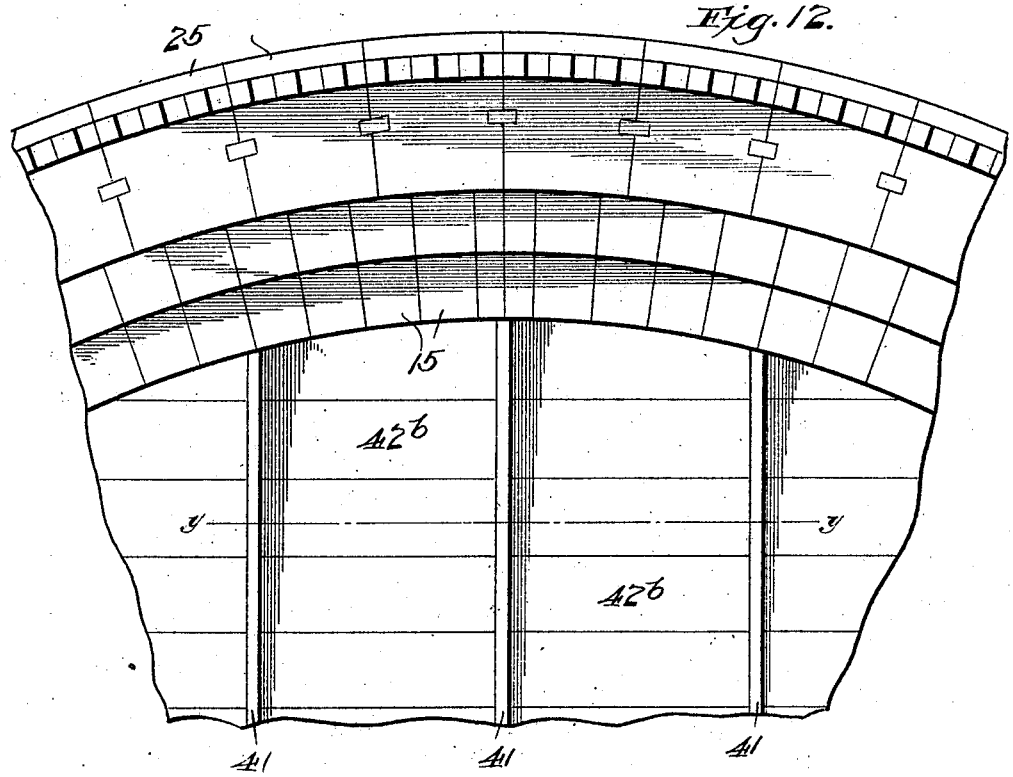
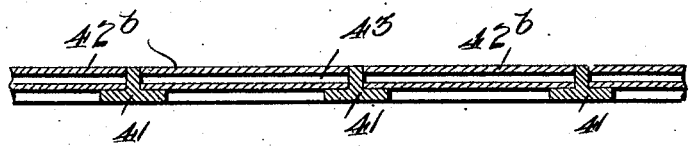
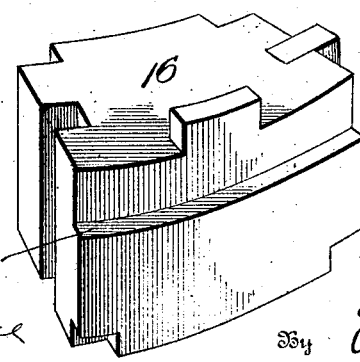
Witnesses
Inventor
Thomas Dougherty
By Edson Bros.
Attorneys No. 849,984. PATENTED APR. 9, 1907.
T. DOUGHERTY.
GRAIN BIN.
APPLICATION FILED JUNE 27, 1905.

6 SHEETS—SHEET 6.

WITNESSES:

INVENTOR-
Thomas Dougherty
By Edson Bros.
Attorneys

UNITED STATES PATENT OFFICE.

THOMAS DOUGHERTY, OF MINNEAPOLIS, MINNESOTA.

GRAIN-BIN.

No. 849,984.

Specification of Letters Patent.

Patented April 9, 1907.

Application filed June 27, 1905. Serial No. 267,266.

*To all whom it may concern:*

Be it known that I, THOMAS DOUGHERTY, a citizen of the United States, residing at Minneapolis, in the county of Hennepin and State of Minnesota, have invented certain new and useful Improvements in Grain-Bins; and I do hereby declare the following to be a full, clear, and exact description of the invention, such as will enable others skilled in the art to which it appertains to make and use the same.

My invention relates to improvements in construction of buildings, more especially to grain bins or elevators.

It has for its object to produce a dry, well-ventilated, strong, and easily and quickly constructed building.

The invention consists particularly in the features of construction of the walls of the building and in such other features of construction and the combinations of the various parts hereinafter described, and more particularly pointed out in the claims concluding this specification.

Figure 2:
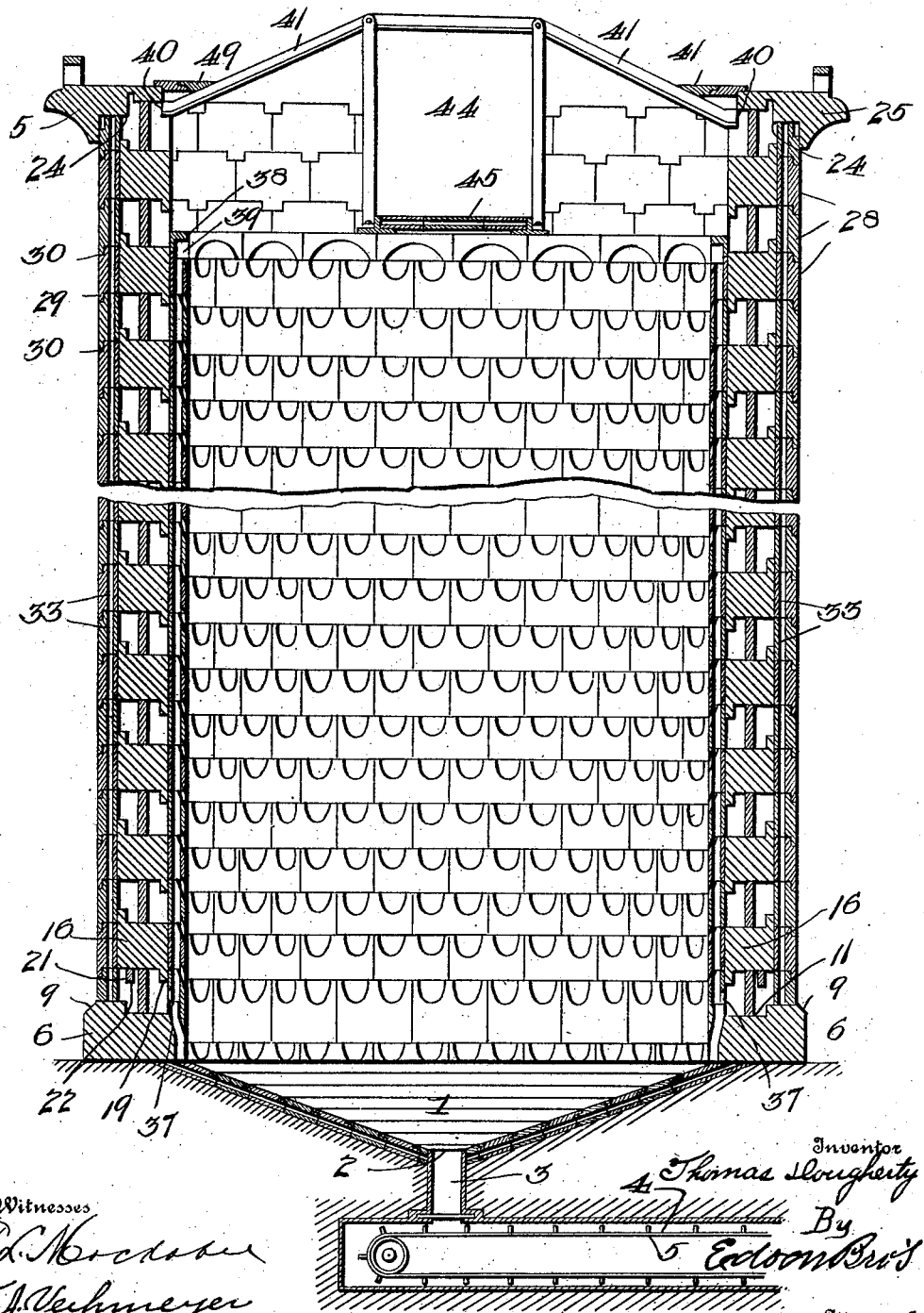
Figure 3:
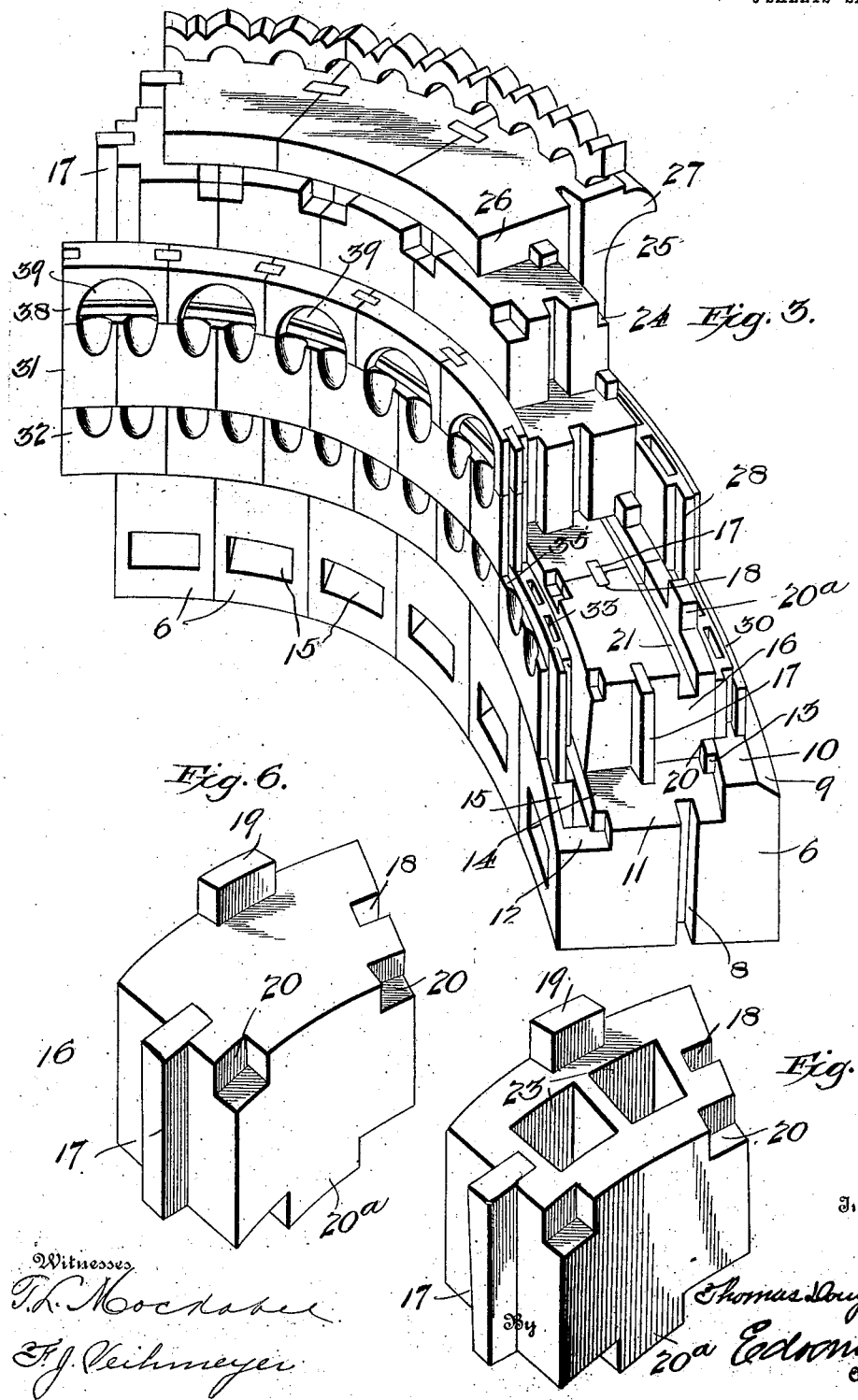
Figure 4:
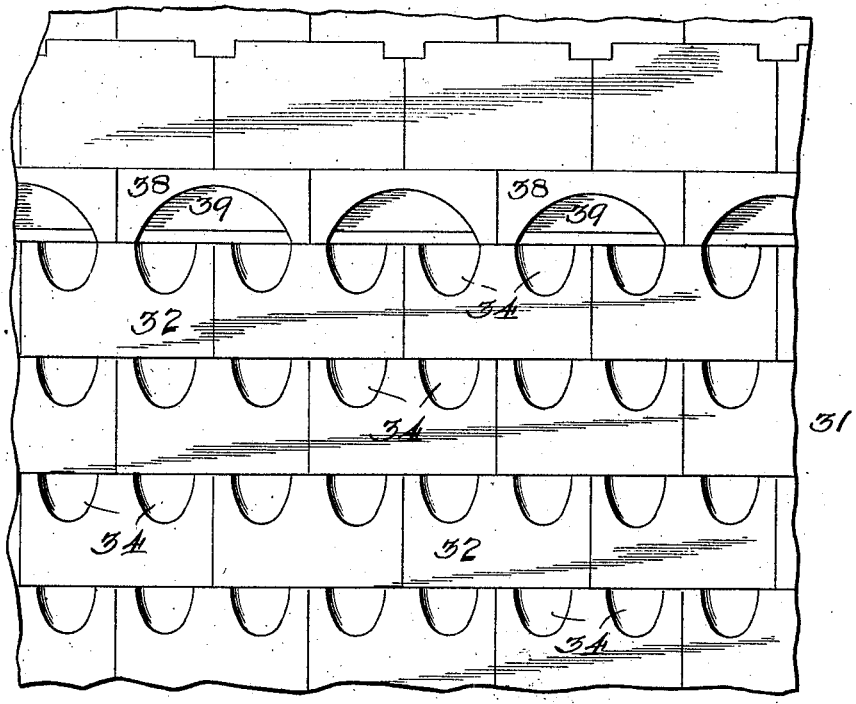
Figure 14:
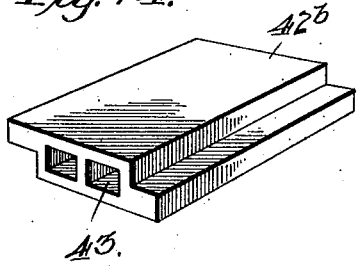
Figure 15:
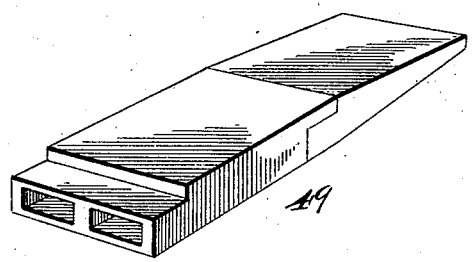
Figure 19:
Figure 11:
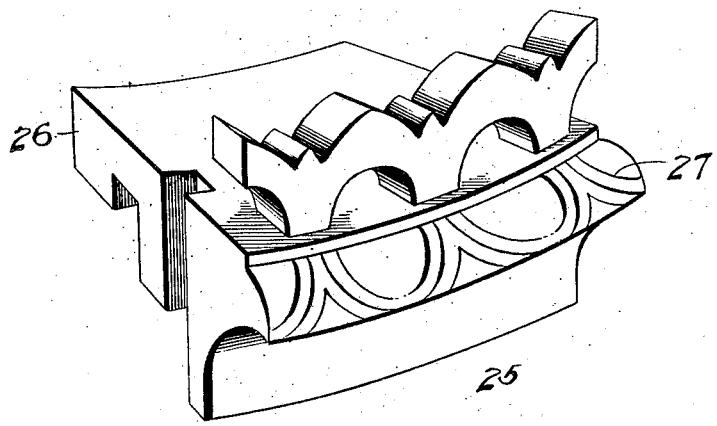
Figure 16:
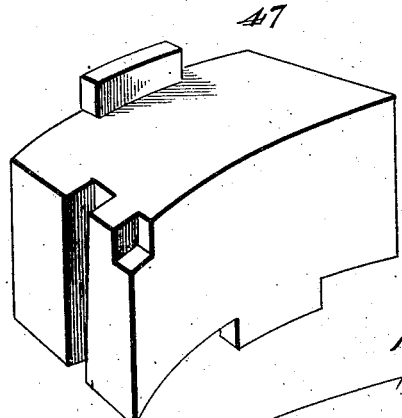
Figure 17:
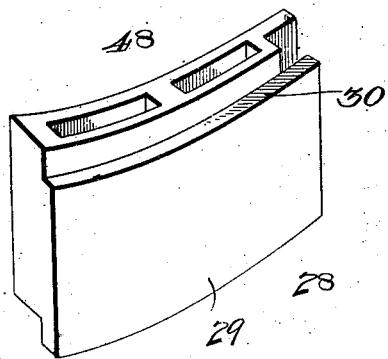
Figure 18:
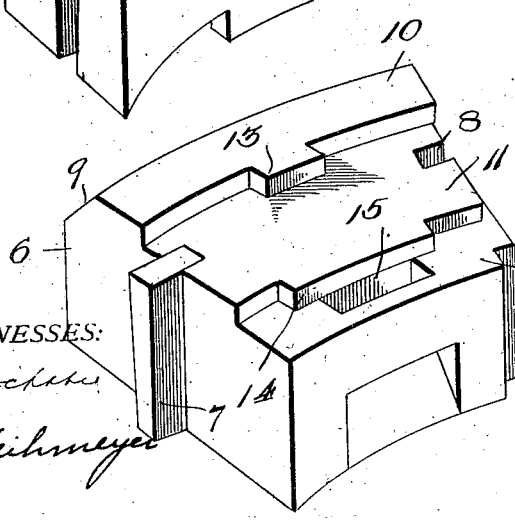

In the accompanying drawings, illustrating the preferred embodiment of my invention Figure 1 is a broken side elevation of a bin constructed in accordance with my invention, looking at one end of the bridge below the roof and showing the belt for conveying the grain from a car or wagon to the filling-door in the floor of said bridge. Fig. 2 is a vertical sectional view taken transversely of the roof-bridge and extending below the surface of the ground to show the shape of the floor of the bin and the means for drawing off the grain. Fig. 3 is an enlarged perspective view of a portion of the walls of the bin. Fig. 4 is an inner view of a portion of the walls. Fig. 5 is a vertical sectional view of the inner circle of blocks or tile and a portion of one of the foundation-blocks of the main wall. Fig. 6 is a detail perspective view of one of the blocks of the intermediate rows of the main wall. Fig. 7 is a detail perspective view of a modified form of said blocks made in skeleton form to secure lightness in weight. Fig. 8 is a similar view of one of the blocks of the top row of the main wall. Fig. 9 is a detail view of one of the blocks or tile of the inner wall. Fig. 10 is a similar view of a modified form of block for this inner wall. Fig. 11 is a detail perspective view of one of the cornice-blocks. Fig. 12 is a broken detail plan view of a portion of the roof, showing how it is constructed. Fig. 13 is a detail sectional view on the line *y y* of Fig. 12, showing the shape of the iron supports for the roof-tile and how said tile are supported on said supports. Fig. 14 is a detail perspective view of one of the roof-tile. Fig. 15 is a detail view of two of the coping-blocks. Fig. 16 is a view of one of the main wall-blocks for use in a doorway. Fig. 17 is a view of an outer wall-block for the same purpose. Fig. 18 is a detail perspective view of one of the foundation-blocks, and Fig. 19 is a perspective view of one of the wedges or tongues.

Referring more particularly to the drawings, in carrying out my invention I construct the floor, walls, and roof of blocks or tile made of composition, preferably fire-proof, or any suitable material. The roof-tile are supported by metal beams, and the walls are strengthened by metal bands, as will be presently described. The floor 1 of the bin slopes from the sides to the center, where an opening 2 is arranged leading to a chute 3, extending downward to the horizontal passage 4, in which is mounted the endless-belt carrier 5, arranged below said chute and by means of which the grain is drawn off from the bin. Said floor 1 is constructed of blocks similar to the roof-blocks presently described.

The walls are built upon broad foundation-blocks 6, made on a curve to conform to the circle of the wall of which it is a part, each block having grooves 8 in each end adapted to receive the wedge-shaped tongues 7, whereby the adjacent blocks are held together. The upper outer edge of each of said blocks is preferably beveled, as at 9, from the outer face to the upper ledge 10. The central and main bearing-surface 11 on the top of the foundation-block for the next row of blocks is stepped down from the ledge 10, and at the inner edge said foundation-block is stepped downward again, forming the inner ledge 12, upon which the inner air-draft wall presently described is supported. A small lug or projection 13 extends from the outer ledge and on a level therewith at the center of the inner face of said ledge, and a similarly-shaped projection or lug 14, preferably of greater length than the first-mentioned one, extends from the level of the central bearing portion part way over the inner flange. The block is provided with an air-passage 15, extending from the central portion of the inner ledge at the base of the lug 14 inwardly at a slight oblique and opening upon the inner face of said block. The next row of blocks 16, arranged above the foundation-blocks, are not as thick as said foundation-block, but only extend from within the outer ledge to the inner face of the lugs 14 on the lower ledge of said latter blocks. Each of said blocks 16 has a lateral tongue 17 and groove 18, as in the foundation-blocks; but they are preferably arranged on the opposite edges— that is, if the tongues are on the left-hand side of the foundation-blocks the tongues on the blocks 16 will be on the right-hand side, as shown clearly in Fig. 3. Said blocks 16 each have a central inner and downwardly-extending lug 19, adapted to fit between the adjacent ends of the lugs 14 on the inner flange of the foundation-blocks. The rear lower edge of said block 16 is cut out at each end, as at 20, to fit over half of the outer lugs 13 on the foundation-blocks, and a lug 20$^a$ projects upward at the center of the upper outer edge of said block 16. It will thus be seen that the blocks 16 are arranged over the tongue-and-groove joints of the foundation-blocks and that their similar joints are arranged over the center of said foundation-blocks. It will also be noted that the downwardly-projecting inner lugs and the upwardly-projecting outer lugs on the blocks of the successive rows above the foundation interlock with the spaces left therefor in the other blocks and brace the wall and render it capable of withstanding great pressure from within, making the construction particularly adapted for grain-bins.

As shown in Fig. 3, the first row of the blocks 16 have curved grooves 21 in their upper surfaces to receive a metal hoop or brace-bar 22. While this arrangement of groove and hoop is only shown in the first row of blocks above the foundation, it may be repeated in as many of the rows above as may be desired. It is preferable to arrange said hoops or brace-bars at intervals up the wall— say about three in a wall of ordinary height.

As shown in Fig. 7, the blocks 16 and those of the successive upper rows may be made in skeleton form and provided with vertical openings or cavities 23 in the center thereof. These openings make the blocks lighter to handle and do not appreciably decrease their strength. The upper rows of wall-blocks are made in the same way as the blocks 16 just described, and the tongues of each successive row are arranged on the opposite sides of the blocks from which they are placed on the next lower row. The top row of said blocks is provided with a ledge 24, upon which rests the cornice tile or blocks 25. Each of said cornice-blocks has an inwardly-extending portion 26, provided with cut-out portions or sockets at each end to fit over half of the upper lugs of the top row of wall-blocks below it. Said cornice-blocks are provided with a molding 27, projecting over the edge of the wall; and it may have an ornamental edging, as shown, to add to the appearance of the structure. Said molding extends down below the other portions of said cornice-blocks, leaving a space between it and the outer surface of the main wall to receive the upper edge of the upper row of the outer wall tile or blocks presently described. The cornice-blocks have lateral tongue-and-groove connection with each other, as in the other blocks.

The outer wall, which rests upon the outer flange of the foundation-blocks, is built of blocks 28, made, preferably, of the same material as the main-wall blocks, but much narrower, being just wide enough to cover the outer flange of the foundation-blocks at the base and fit between the outer surface of the main wall and the molding of the cornice. Said outer-wall blocks are preferably provided with vertical openings, as shown, for lightness and ventilation and are secured by lateral tongue-and-groove joints in rows. Each successive row of these blocks above the first is provided with an outer flange 29, adapted to fit upon an outer flange 30 on the row below, thus locking the latter in against the main wall, the top row of the blocks 28 of the outer wall extending within the downwardly extending portion of the molding of the cornice and holds all below it in place.

The inner air-draft wall 31 is also composed of rows of grooved blocks 32, adapted to be secured together by wedge-shaped tongues, like those used for the main-wall blocks, and arranged one above the other, the bottom row resting upon the inner flange of the foundation-blocks and the upper row arranged near the top of the main wall. The circular form of the inner wall, together with the tongue-and-groove connection between the blocks of each row, prevents said wall from falling inward. Each of the blocks 32 is provided with vertical air-passages 33, which in construction are arranged to register with those in the block below. Each of the blocks also has an oblique passage 34 opening on its inner face and communicating with the passage 33 below the overhanging flange 34$^a$ of the block in the row above, which ledge rests upon a ledge 35 of the block described. The flange 34 is preferably undercut, as at 36, opposite the passages 34 to give a freer communication to the passage 33. Said flange extending down below the juncture of the passages 34 and 33 prevents the grain from passing into and stopping the passage 33. The bottom row of the blocks 32 is provided with a circumferential passage 37, connecting the various vertical air-passages 33 and formed by cutting away the inner lower edge of said lower row of blocks. These circumferential passages may be repeated at intervals up the wall to give freer circulation of the air. The top of blocks 38 of the inner wall is formed with arches 39 or other suitably-shaped openings leading from the inner face of said blocks to the upper openings of the air-passages 33. The upper edge of said blocks 38 is preferably imperforate and protects the openings of said passages 33.

In Fig. 10 a modified form of block for use in the inner wall is shown. In this construction instead of having flanges extending down over the passages 34 a rounded projection extends down from the blocks of one row over each separate passage in the blocks of the row below.

The top row of blocks of the main wall is provided with recesses 40 for the angle-irons 41, which support the roof-tile 42, having overlapping stepped edges 42ª. The roof is rounded in form, the spaces between the parallel angle-irons being filled with said roof tile or block 42, as shown in Figs. 13 and 14. Said blocks are provided with the ventilating-passages 43. (Shown in Fig. 15.) Transversely across just below the roof is arranged the bridge 44, the floor and sides of which are covered by the roof-blocks or other material. The floor of said bridge is provided with the trap door or opening 45, above which the upper end of the endless conveyer 46 is mounted and into which the grain is dumped by said conveyer in filling the bin. The conveyer 46ª used may be of any desired and suitable construction and should extend down near the base of the bin and have means to bring it in contact with the grain to be stored in the bin. Any suitable device for tripping the conveyer-buckets may also be provided. At the ends of the bridge the doorways or openings are made in the main and outer walls by the use of square-ended blocks 47 and 48, respectively, as shown in Figs. 16 and 17. The coping tile or blocks 49 (shown in Fig. 15) are arranged endwise in pairs. Their sides and edges converge, and they are provided with ventilating-passages therethrough, as in the roof-blocks. These coping-blocks have overlapping stepped ends—that is, the larger end of the smaller block is so connected to the smaller end of the larger block, while the stepped portion or flange at the larger end of the larger block engages the inner edge of the cornice-blocks. Said pairs of coping blocks or tile are arranged side by side near the edge of the roof, as shown in Fig. 12.

Having thus described my invention, what I claim as new, and desire to secure by Letters Patent, is—

1. The combination, in a structure of the character described, with a main wall, of a hollow inner wall in contact with said main wall and provided with air-passages therein having tributary passages opening at intervals throughout the inner surface of said inner wall for the purpose specified.

2. The combination, in a structure of the character described, with a main wall, of an inner wall provided with air-passages therein having obliquely-arranged tributary passages extending through to the inner surface of said inner wall.

3. The combination, in a structure of the character described, with a main wall, of an inner wall provided with air-passages therein having obliquely-arranged tributary passages therein extending downward and inward from said main passages through to the inner face of said inner wall.

4. The combination, in a structure of the character described, with a main wall, of an inner wall provided with air-passages therein having obliquely-arranged tributary passages extending downward and inward from said main passages through to the inner faces of said inner wall, the upper edge of the opening of said tributary passages upon the inner face of said inner wall being arranged below the lower edge of the opening of said tributary passage into said main passage.

5. In a structure of the character described, the combination with a main wall, of an outer wall and an inner wall arranged in juxtaposition to said main wall, said inner wall being hollow and having air-passages therein opening upon the interior of said wall, said walls all resting upon a common foundation.

6. In a structure of the character described, the combination with a foundation composed of interlocking blocks each having an upwardly-projecting lug arranged near the outer edge thereof and the corners of the upper inner edge cut away, of a wall superimposed upon said foundation, said wall comprising laterally-interlocking blocks each provided with a downwardly-extending lug on cut-the lower inner edge adapted to engage the out portion of adjacent foundation-blocks, each of said wall-blocks also having their lower rear corners cut out to receive the rear lug of a foundation-block, and upwardly-extending lugs on their upper outer edges.

7. In a structure of the character described, the combination with a foundation composed of interlocking blocks each having an upwardly-projecting lug arranged near the outer edge and centrally thereof, and the corners of the upper inner edge cut away, of a wall superimposed upon said foundation, said wall comprising laterally-interlocking blocks each provided with a downwardly-extending lug on the lower inner edge and centrally thereof, said lug adapted to engage the cut-out portions of adjacent foundation-blocks, each of said wall-blocks also having their lower rear corners cut out to receive the rear lugs of a foundation-block, and upwardly-extending lugs arranged centrally of their upper outer edges.

8. In a structure of the character described, the combination, with a main wall, of an outer wall, said main wall having upwardly-projecting lugs on its outer edge, and a cornice having a molding projecting down over and below the upper edge of the outer wall.

9. In a structure of the character described, the combination with a main wall built of rows of interlocking blocks, of an outer wall also constructed of rows of interlocking blocks, the upper row of the blocks of the main wall provided with an outer ledge and upper projecting lugs, and a cornice extending over both walls and comprising interlocking blocks having cavities to fit over said lugs and an overhanging molding extending down over and below the upper edge of the outer wall.

10. In a structure of the character described the combination with the walls, of the roof and a bridge arranged transversely across between the opposite sides of the walls just below the roof, the floor of said bridge provided with openings for filling the structure.

11. In a structure of the character described, the combination with a main wall, of an outer wall, a roof, a cornice, extending over both walls, secured to the main wall and having a molding projecting down over and below the upper edge of the outer wall, and coping-blocks arranged between the cornice and the roof, substantially as described.

In testimony whereof I affix my signature in presence of two witnesses.

THOMAS DOUGHERTY.

Witnesses:
WILLIAM FOY,
PETER RIEL.